United States Patent [19]

Herbst et al.

[11] Patent Number: 5,437,526
[45] Date of Patent: Aug. 1, 1995

[54] ARRANGEMENT FOR ANCHORING A ROD-SHAPED TENSION MEMBER OF COMPOSITE FIBER MATERIAL

[75] Inventors: Thomas Herbst, Wessling; Berthold Bolmer; Hartmut von Grolman, both of Haren; Anton Lügering, Meppen; Lorenz Schnitzler, Pöcking, all of Germany

[73] Assignees: Dyckerhoff & Witmann Aktiengesellschaft, Munich; Rochling Haren KG, Ems, both of Germany

[21] Appl. No.: 993,716

[22] Filed: Dec. 18, 1992

[30] Foreign Application Priority Data

Dec. 21, 1991 [DE] Germany .................. 41 42 713.0
Mar. 21, 1992 [DE] Germany .................. 42 09 265.5

[51] Int. Cl.⁶ .................. F16B 35/00; F16B 35/04; E21D 20/02
[52] U.S. Cl. .................. 411/366; 411/414; 411/432; 411/436; 411/908; 405/259.5
[58] Field of Search ........... 411/908, 263, 366, 307, 411/436, 438, 432; 405/259.1, 259.5, 259.6

[56] References Cited

U.S. PATENT DOCUMENTS

| | | | |
|---|---|---|---|
| 1,922,689 | 8/1933 | Linnenbruegge | 411/307 X |
| 3,713,932 | 1/1973 | Butzow et al. | 411/436 X |
| 4,846,614 | 7/1989 | Steinbock | 411/263 X |
| 4,863,330 | 9/1989 | Olez et al. | 411/908 X |
| 4,958,961 | 9/1990 | Herbst et al. | 405/259.5 |
| 5,060,740 | 10/1991 | Yousef et al. | 411/414 X |
| 5,080,547 | 1/1992 | Moghe | 411/908 X |

FOREIGN PATENT DOCUMENTS

0403940A1 12/1990 European Pat. Off. .
3504829A1 8/1986 Germany .
3834266A1 4/1990 Germany .

Primary Examiner—Neill R. Wilson
Attorney, Agent, or Firm—Friedrich Kueffner

[57] ABSTRACT

An anchoring arrangement for use in underground mining or foundation work or as a reinforcing element for concrete includes a rod-shaped tension member of composite fiber material which has, over at least an anchoring portion thereof, a helically extending external thread with ribs formed by impressing valleys in the tension member. An anchoring member having a corresponding internal thread can be screwed onto the tension member. For obtaining a radial pressure on the tension member as a result of a wedge effect, the angle of inclination of the sides of the thread relative to the longitudinal axis of the tension member is smaller than 45°. The thread preferably is a flat trapezoidal thread. In an anchoring member which is stiff relative to circumferential tensile forces, the flat angle of inclination of the sides of the thread increases the radial pressure acting on the tension member, which leads to an increased effect into the depth and a higher resistance to shearing. The anchoring member may have a changing circumferential tensile stiffness over the length of the threaded engagement with the tension member, so that the anchoring member can expand at the point of highest stress concentration, with the result that a change in length of the tension member may occur.

26 Claims, 4 Drawing Sheets

ARRANGEMENT FOR ANCHORING A ROD-SHAPED TENSION MEMBER OF COMPOSITE FIBER MATERIAL

BACKGROUND OF THE INVENTION

1. Field of the Invention

The present invention relates to an arrangement for anchoring a rod-shag tension member of composite fiber material which is composed of unidirectional fibers embedded in a matrix of synthetic resin, particularly for use as an anchoring element in the construction of foundations, in underground mining, as a reinforcing element for concrete, particularly for pre-stressed concrete, and the like.

2. Description of the Related Art

In recent years, instead of tension members of steel, tension members of high-strength composite fiber materials have increasingly been used in structural engineering projects. While having approximately the same tensile strength as tension members of steel, tension members of composite fiber materials, such as polyamid fibers, aramid fibers, glass fibers, or carbon fibers, have a lower specific gravity as compared to those of steel, and they particularly have a greater resistance to corrosion. Accordingly, because of these properties, tension members of composite fiber materials can be used advantageously as anchoring elements in foundation work and underground mining, where aggressive water frequently occurs which poses the danger of corrosion to tension members of steel.

Moreover, the behavior of tension members of composite fiber materials, when used under load, is similar to that of tension members of steel, i.e., they have an essentially linear stress-strain line. However, contrary to tension members of steel, tension members of composite fiber materials do not have a yield point; rather, they break when the breaking strength or tensile strength of the tension member is reached without prior plastic deformation. Because of this property and because of the fact that, in contrast to the tensile strength in longitudinal direction of the fibers, the tension members of composite fiber materials only have a low transverse compressive strength, anchoring arrangements which are otherwise known and proven in structural engineering cannot be directly transferred to anchoring arrangements which use tension members of composite fiber materials.

The use of threaded anchoring arrangements with conventional thread profiles poses a problem when anchoring tension members of composite fiber materials because the tensile force in the tension member is transmitted in the region of the threads to the respective anchoring element essentially through an axial shearing force which causes shearing stress in the threads. In order to prevent the threads from shearing off, to prevent the fiber strand from breaking open in radial planes, and to prevent cylindrical outer portions from shearing off relative to cylindrical inner portions in the region of the thread of rod-shaped tension members, it is known in the art to arrange the fibers in an outer region in alternating inclined directions and to anchor the outer fibers by means of textile interlinking with fibers which are located deeper inside (DE OS 35 04 829). However, even in a thread produced in this manner, the shearing effect remains dominant when a load is applied.

In an anchoring arrangement of the above-described type, it is also known in the art to arrange a buffer layer as a plastification zone between a tension member of composite fiber material and an anchoring member of steel, and particularly between the sides of the threads of these two elements which are in engagement with each other (DE OS 38 34 266). The strength of the material used for this buffer layer must be lower than the strength of the composite fiber material with respect to transverse compression, so that, under load and after a certain compressive stress has been reached, substantial deformations are possible with small increases of stress.

In this connection, it has also been proposed to manufacture the profiles of the tension member, which may be composed of an asymmetrical trapezoidal thread, by applying a deformation pressure on the rod from the outside in radial direction during hardening of the synthetic resin which surrounds and glues together the unidirectional fibers. The deformation pressure impresses thread valleys into the rod. Consequently, the fibers of the rod are not severed; rather, the direction of the fibers is only slightly deflected.

Finally, it is also known in the art to produce an anchoring element as a nut of plastics material in which the threads are reinforced by a reinforcement composed of warps and wefts (EP 0 403 940 A1). However, this type of reinforcement also does not reduce the shearing stresses in the threads of the tension rod.

SUMMARY OF THE INVENTION

Therefore, it is the object of the present invention to provide an anchoring arrangement of the above-described type in which the threads are constructed in such a way that the strength properties of composite fiber materials are taken into account, wherein the dangerous shearing stresses in the thread are avoided, and the additional insertion of a buffer layer as a plasticizing zone is unnecessary.

In accordance with the present invention, in an anchoring arrangement of the above-described type, which includes a tension member provided over at least the portions intended for anchoring with ribs formed by impressing valleys and extending along a helical line and forming a continuous thread, and an anchoring element which has a corresponding internal thread and can be screwed onto the tension member, the angle of inclination of the sides of the ribs forming the thread relative to the longitudinal axis of the tension member being smaller than 45° in order to obtain a wedge-type effect for producing a radial pressure acting on the tension member.

The anchoring arrangement according to the present invention combines the effects of a screw-type anchoring system with that of a wedge-type anchoring system. Because of the relatively flat angle of inclination of the sides of the ribs forming the thread, an anchoring member which is stiff with respect to circumferential tension increases the radial contact pressure acting on the tension member. This increases the effect into the depth of the tension member and, thus, results in a greater shearing resistance. Thus, the anchoring member not only acts with the internal thread required for tensioning the anchoring arrangement and absorbing the axial shearing forces, but additionally acts as an annular sleeve for obtaining the wedge-type effect.

When the tension member is manufactured, the flat angle of inclination also makes it possible to introduce the originally unidirectionally extending fibers into the thread profile, so that the individual ribs of the thread have the full fiber density of the cross section of the tension member.

Another improvement of the transmission of the force can be obtained by changing the unidirectional fiber arrangement in the anchoring area in such a way that fibers which are located in the interior are conducted outwardly and, thus, these fibers extend over a short length into the area of immediate influence of the wedge-type clamping force.

In the anchoring arrangement according to the present invention, it is basically possible to provide a tension member of composite fiber material with an anchoring member of steel. However, if the anchoring arrangement is to have certain properties of the composite fiber material, such as resistance to corrosion, it is also desirable to make the anchoring element of composite fiber material.

In this case, another development of the present invention provides that the anchoring member has a circumferential tensile strength which changes over the length thereof in accordance with the length of the thread engaged with the tension member.

Because of the lower modulus of elasticity, tension members of composite fiber materials are stretched substantially more than corresponding tension members of steel when the same loads are applied. Since, in the area where an anchoring member is screwed onto a tension member, the tension member is stretched because of the load while the anchoring member which is placed against a fixed abutment is compressed, high stress concentrations occur, especially at the end of the anchoring member facing the contact surface, while reserves are still available at the opposite free end of the anchoring member which cannot be utilized.

The combination according to the present invention, which includes a thread with ribs whose sides have a flat angle of inclination, i.e., a so-called wedge-type thread, and the resulting comparatively high radial forces which cause circumferential tensile stresses in the anchoring member which acts as an annular sleeve, makes it possible to provide the anchoring member with a circumferential tensile stiffness which changes over the length of the further engagement with the tension member, so that the anchoring member can expand at the point of high stress concentration and, consequently, the tension member can stretch to some extent. As a result, the force to be anchored can be distributed more uniformly over the length of the further engagement between tension member and anchoring member, so that the material can be better utilized.

The circumferential tensile stiffness of the anchoring member can be changed in a relatively simple manner by changing the cross-sectional size thereof. However, since structural components of plastics material usually do not have a strength which is sufficient for absorbing the circumferential tensile forces, additional measures are required for absorbing the circumferential tensile forces. For example, an appropriate reinforcement may be provided which may simultaneously serve to absorb the axial shearing forces, or different reinforcing elements may be provided. Accordingly, the circumferential tensile stiffness can also be changed by changing the cross-sectional size of the reinforcement, wherein either the cross-sectional sizes of the reinforcement elements themselves are changed or additional reinforcement elements may be provided at certain locations.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DESCRIPTION OF THE PREFERRED EMBODIMENTS

Figure 1:
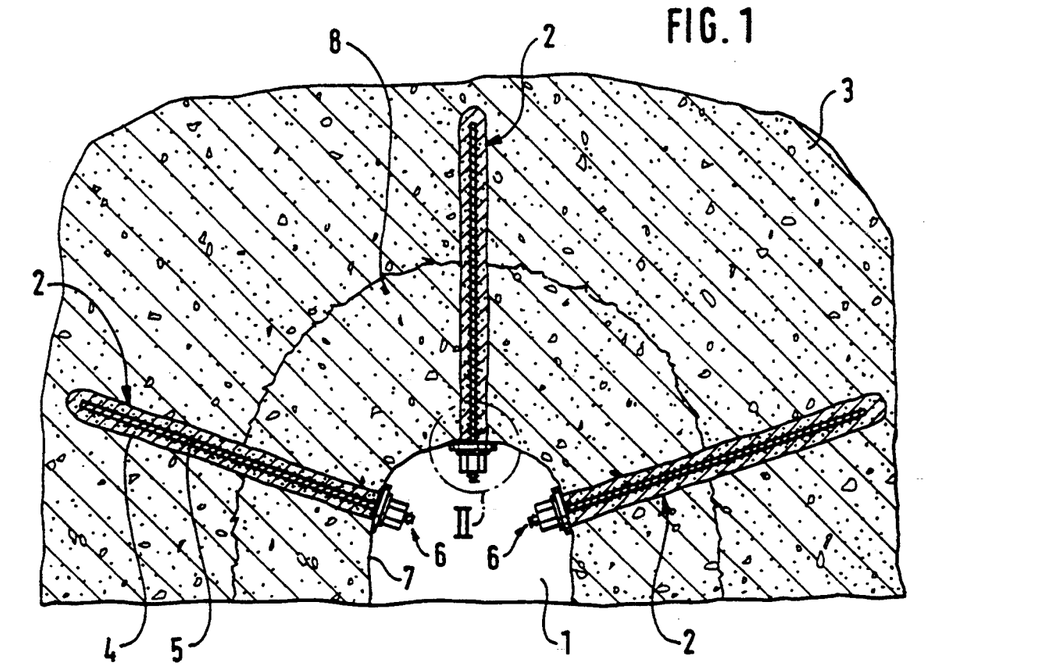
FIG. 1 is a schematic sectional view of a tunnel to be driven in rock with rock anchors for securing the rock.

A typical application of an anchoring arrangement according to the present invention, composed of tension member and anchoring member of composite fiber material, is to secure rock formations in the areas of rock removal, for example, for driving a tunnel. FIG. 1 is a cross-sectional view showing an initially driven pilot tunnel 1 from which rock anchors 2 are radially driven into the rock 3. Each rock anchor 2 is composed of a tension rod 5 placed in a bore hole 4 and an anchoring means 6 at the end of the tension rod 5 projecting out of the rock.

By injecting material which can solidify into the bore hole 4, the tension rod 5 is fixed in the bore hole 4, so that it can be tensioned relative to the rock surface 7.

In addition to the lower weight and the greater resistance to corrosion, the use of tension rods of composite fiber material, as compared to those of steel, has the advantage that the tension rods 5 can be destroyed by means of forces acting transversely to the longitudinal axis thereof when the shaded cross-sectional area 8 is later removed.

Figure 2:
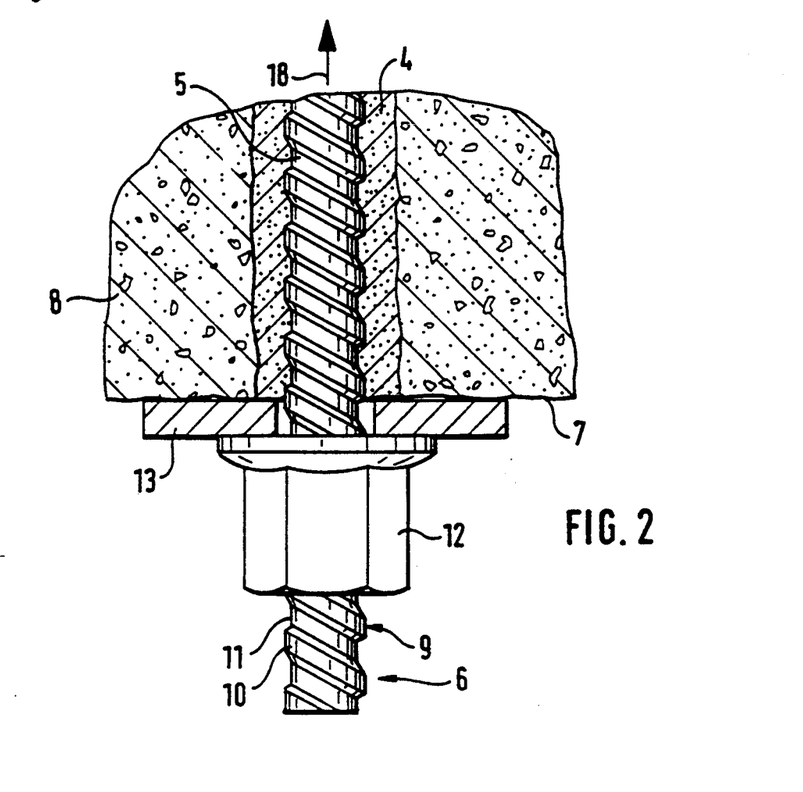
FIG. 2 is a schematic view, on a larger scale, showing detail II of FIG. 1, i.e., the anchoring area of a rock anchor with an anchoring member of steel.

FIG. 2 of the drawing shows, on a larger scale, a longitudinal sectional view of an anchoring arrangement 6 for such a rock anchor 2. The tension rod 5 is composed of a composite fiber material of appropriate strength. Glass fibers are particularly suitable as the material of the tension rod, because the lateral compressive strength is relatively high, as compared to other fibers. The fibers are advantageously embedded in a matrix of epoxy resin. The tension rod has at its surface a profiling which forms a thread 9 of ribs 10 and valleys 11. A nut in the form of an anchoring member 12 is screwed onto the thread of the rod 5. The anchoring member 12 rests against an anchor plate 13 which, in turn, is in contact with the surface 7 of the rock.

The illustration of the anchoring arrangement according to the present invention, in the form of a rock anchor as shown in FIGS. 1 and 2, is to be understood to be an example only. Of course, the present invention can also be utilized in other types of threaded tension elements, such as tension members, and in anchoring systems, as well as in connections of appropriately constructed rods of composite fiber materials.

Figure 3:
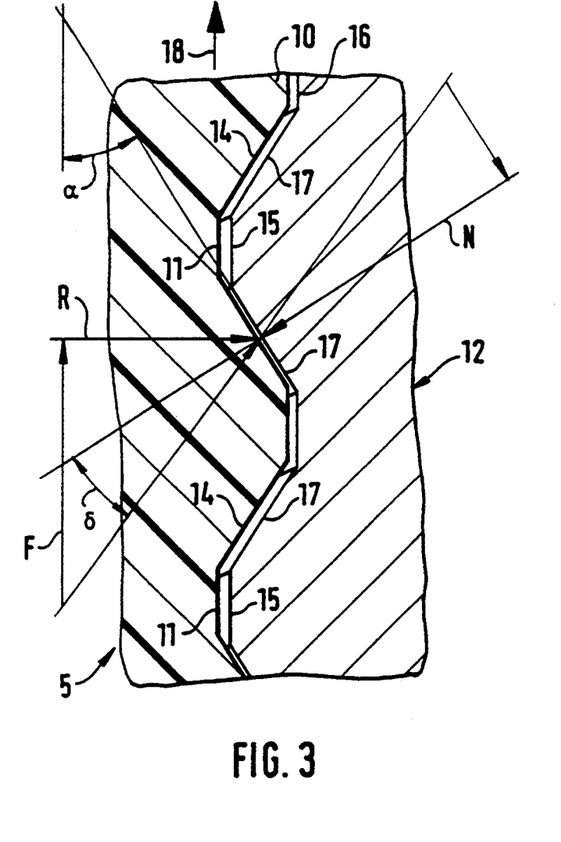
FIG. 3 is a sectional view, on an even larger scale, showing the engagement of the threads of the tension member and the anchoring member according to the present invention and the forces acting in the region of force transmission.

FIG. 3 of the drawing shows only a small portion of the force transmission area in a longitudinal section between the tension rod 5 and the anchoring member 12. Thus, FIG. 3 only shows the surface of the rod 5 with the thread 9 composed of ribs 10 and valleys 11 between the ribs 10. The thread 9 is a flat trapezoidal thread in which the sides 14 between the ribs 10 and the valleys 11 extend at an angle relative to the longitudinal axis of the rod which, in the illustrated embodiment, is approximately 30°. Another conceivable type of thread is a flat knurled thread.

As is conventional, the anchoring member 12 screwed onto the tension rod 5, shown in FIGS. 2 and 3, is of steel. However, the anchoring member 12 may also be composed of composite fiber materials. The anchoring member 12 is profiled at its inner surface with a thread composed of ribs 15 and valleys 16, corresponding to the thread of the tension rod 5, i.e., the sides 17 between the ribs 15 and the valleys 16 extend at the angle $a$ relative to the longitudinal axis of the rod 5 in the same manner as the sides 14 of the thread of the rod 5.

When a tensile force is applied to the tension rod 5 in the direction of arrow 18, while the anchoring member 12 rests against the anchor plate 13, the sides 14 of the tension rod 5 rest over a predetermined contact area directly against the sides 17 of the anchoring member 12 having the same inclination. When taking into account the friction angle 6, the tensile force F results in a normal force N and a radial force R. The radial force R is absorbed in the anchoring member 12 in the form of a circumferential tensile force, while the normal force N is directed into the depth of the cross-section of the tension rod 5.

As is the case in a wedge-type anchoring system, the magnitude of the radial force R depends on the angle $a$, i.e., the inclination of the sides 14 and 17 relative to the longitudinal axis of the tension rod 5. Thus, as the radial force R increases in relation to the anchoring force F, the more it acts into the depth of the rod 5. In any event, it is significant in connection with the present invention that the radial force R dominates in the area of force transmission between the thread of the rod and the thread of the anchoring member. Only in this manner can a support effect be achieved which combines the advantageous properties of a screw thread with that of a wedge-type anchoring system.

In order always to achieve a full contact between all sides of the threads and to counteract any peak stresses which might occur as a result of the fact that the tension rod is stretched and the anchoring member is compressed under load in the area of engagement of the thread of the rod and the thread of the anchoring member, another feature of the present invention provides that the threads of the tension rod and of the anchoring member have different pitches, wherein the pitch of the thread of the anchoring member is slightly greater than the pitch of the thread of the tension rod.

The thread of the tension rod 5 is produced in an advantageous manner by applying a deformation pressure in radial direction from the outside on the rod 5 during the solidification of the synthetic resin which surrounds the unidirectional fibers and glues the fibers together, so that the valleys 11 are formed by pressing them into the rod. As a result, the unidirectional fibers are not severed, but only the direction thereof is slightly changed.

Figure 4:
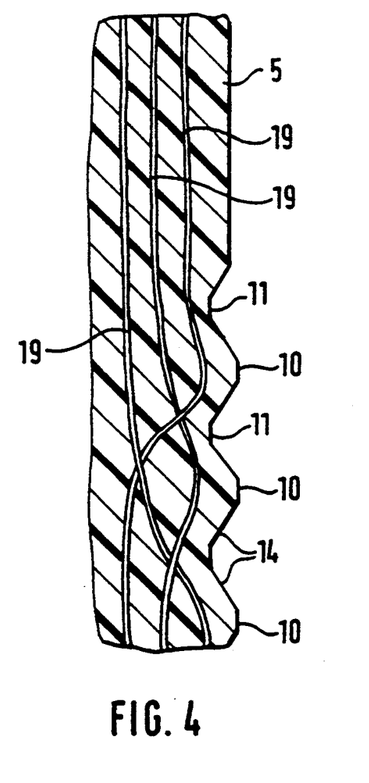
FIG. 4 is a schematic partial sectional view of the area of the thread of the tension member.

In order to be able to better absorb the forces directed into the depth of the tension rod 5 and to distribute the forces better over the cross section of the rod 5, it is advantageous if the inner directional arrangement of the fibers is changed in the area of anchoring in such a way that the inner fibers 19 extend outwardly and, thus, are arranged over a short length in the immediate area of the influence of the clamping effect. This is schematically illustrated in FIG. 4, which represents a partial longitudinal sectional view of the threaded portion of the tension rod 5.

The configuration of the thread according to the present invention, in which the sides 14 of the ribs 10 are only slightly inclined relative to the longitudinal axis of the tension rod 5, produces high transverse pressures on the tension rod itself, which must be absorbed as circumferential tensile forces by an anchoring or connecting element which has the internal thread. If such an anchoring or connecting element is composed uniformly of a tension-proof material, such as steel, the circumferential tensile stresses are absorbed with little deformation, even when the wall thicknesses are small, because the member having the internal thread also acts as an annular sleeve.

However, if the anchoring arrangement is to have certain properties of the composite fiber material, such as the resistance to corrosion, the anchoring member is frequently also made of other materials, such as plastics materials. However, plastics materials, such as thermoplastic materials or thermosetting materials, are not suitable for absorbing high circumferential tensile stresses, so that the function of an annular sleeve cannot be achieved by anchoring members made exclusively of such plastics materials.

FIGS. 5-9 of the drawing show several embodiments of an anchoring member composed of a combined material, i.e., of plastics material and tension-proof material, which can be manufactured economically and which makes it possible not only to absorb the high circumferential tensile forces from the flat thread, but also to ensure the axial force transmission in the thread.

Figure 5:
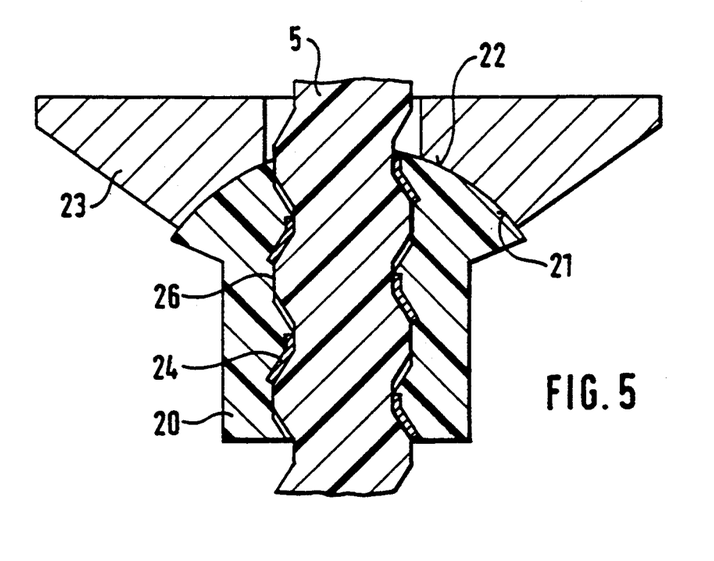
FIG. 5 is a sectional view of an anchoring member of plastics material.

FIG. 5 shows an anchoring arrangement similar to FIG. 2, for a tension rod 5 with an anchoring member 20 of plastics material which has an internal thread and, for obtaining a certain articulating effect, rests with a spherical segment surface 21 against a surface 22 of an anchor plate 23 having a corresponding shape. A reinforcement 24 is embedded in the thread 26 of the anchoring member 20.

Figure 6:
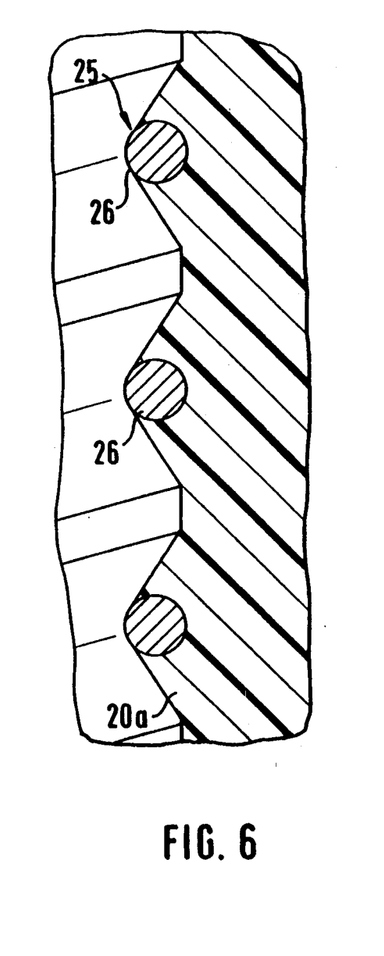
FIGS. 6–9 are partial sectional views of anchoring members having different configurations of reinforcing elements.
Figure 7:
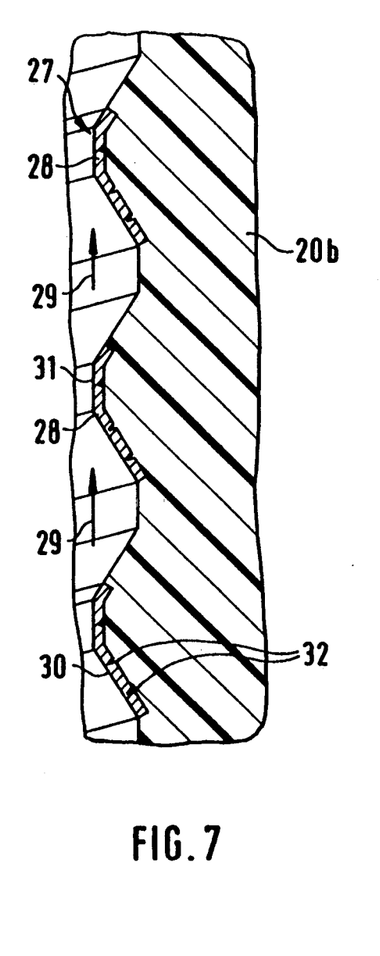
Figure 8:
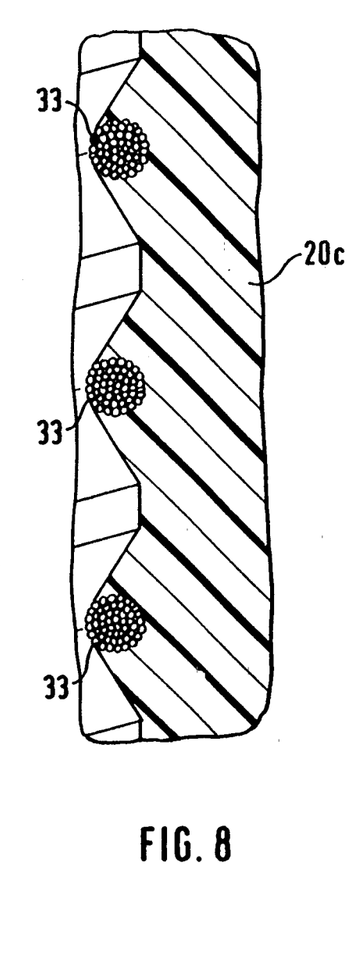

FIGS. 6-8 show embodiments of such anchoring members in which tension-proof reinforcements which are essentially not susceptible to elongation are embedded in the thread of the anchoring member. Such reinforcements are particularly effective if they helically follow the thread directly and are located in the peak, or in the area of the peak, of the internal thread of the anchoring member 20. The reinforcements provide a particularly great reinforcement effect at this location because they serve to absorb the circumferential tensile stresses as well as the axial shearing stresses.

A particularly simple reinforcement is a spiral 25 of round steel, as shown in FIG. 6, wherein the windings 26 of the spiral are located in the peaks of the thread and form the thread profile in this highly stressed area.

A very uniform load application and favorable load transfer is achieved by a steel strip 27, as shown in FIG. 7. The steel strip 27 also extends spirally, and the windings 28 thereof reinforce the sides 30, which are subject to the highest loads in the direction of arrows 29, and the peaks 31 of the thread. The rear side of the strip 27 may be provided with profiling 32, such as grooves, fibs, or the like, for improving the adherence to the anchoring member.

As shown in FIG. 8, instead of solid steel wires or strips, it is also possible to use bundles or strips 33 of very fine wires or fibers, particularly metal fibers, especially steel fibers, as well as non-metal fibers such as carbon fibers, aramid fibers, or the like. The capability of these materials of assuming different shapes further makes it possible to arrange windings at a fight angle relative to the longitudinal axis, and not along the helical line determined by the thread.

Figure 9:
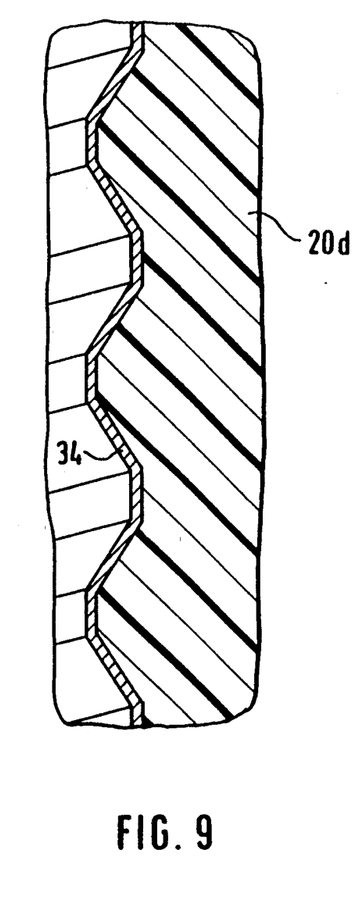

If a closed thread 34 is used, as shown in FIG. 9, which may be formed, for example, by impressing a pipe, by helical winding, or by longitudinal welding, the thread may be placed as a core into an injection molding device for manufacturing the anchoring member 20, in order to simplify the manufacture.

It is possible to obtain an anchoring member with variable circumferential tensile stiffness over the height of the anchoring member by appropriate selection or arrangement of the reinforcing elements.

Thus, in the force transmission area between a tension rod 5 and an anchoring member of plastics material, the anchoring member, in the area of the thread, can be provided with a helical reinforcement.

In this embodiment, the individual windings have different cross-sectional areas. The different cross-sectional areas are obtained by using a steel strip whose shape remains the same while its thickness changes over the length of the steel strip forming the spiral. The uppermost winding facing the anchoring surface, has a smaller cross-sectional area than the next following winding which, in turn, has a smaller cross-sectional area than the next following winding, etc. In the area of engagement with the thread profile, a radial force R acts through the inclined sides 14 of the ribs 10 on the anchoring member, which in this area must be absorbed as a circumferential tensile force. In the area of the lower circumferential tensile stiffness, due to the fact that the uppermost winding has a smaller reinforcement cross section, this radial force R causes an expansion of the anchoring member. As a result of the geometry of the thread profile, an axial elongation of the tension rod 5 is possible in this area. The described phenomenon continues analogously in the areas of the following windings.

Of course, the above description is only very general. Thus, it is possible to provide various numbers of windings and to increase or decrease the differences in the cross-sectional sizes of the windings. Also, it is possible to obtain the different circumferential tensile stiffnesses of the anchoring member in a different manner.

In the anchoring member, a separation can be made between the reinforcing elements which serve to transmit the axial forces, and the reinforcing elements which are provided for absorbing the circumferential tensile forces. A helical member, which may also be composed of several individual components, serves to transmit the axial forces, wherein the helical member covers the sides of the ribs which face the load, as well as the peaks and valleys. A steel wire spiral is embedded in the anchoring member over the entire height thereof for absorbing the circumferential tensile forces. The circumferential tensile stiffness is changed over the height of the anchoring member by providing an additional spiral. Additional appropriately arranged spirals may be arranged following this spiral.

In another anchoring member, which the reinforcing elements for absorbing the axial forces are separated from the reinforcing elements for absorbing the circumferential tensile forces. In this case, the thread profile is a closed sleeve. The anchoring member is capable of absorbing circumferential tensile forces in the known manner by means of fiber materials embedded in the anchoring member.

In order still to provide a sufficiently large contact surface of the anchoring member with the anchoring surface, the changing circumferential tensile stiffness is obtained by reducing the cross-sectional size of the anchoring member by providing slots which reduce the cross-sectional size of the anchoring member toward the anchoring surface.

Figure 10:
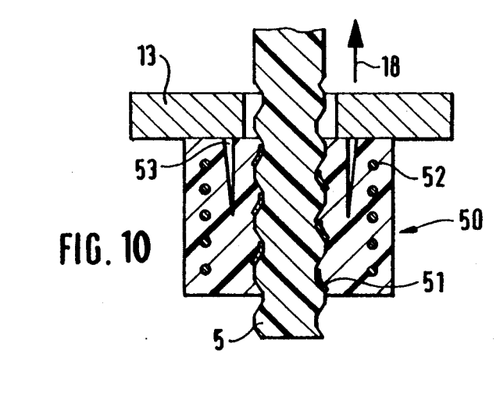
FIGS. 10–12 are sectional views of additional embodiments of the anchoring member according to the present invention.

Two additional embodiments for changing the circumferential tensile stiffness of the anchoring member by reducing the cross-sectional size are illustrated in FIGS. 10 and 14. Thus, the anchoring member 50 shown in FIG. 10 is provided with reinforcing elements 51 in the area of the thread for absorbing the axial forces and with a reinforcement 52, for example, a spiral for absorbing the circumferential tensile forces. In order to make it possible for the anchoring member 50 to expand in the area of the contact with the anchor plate 13, a wedge-shaped annular gap 53 is provided in the anchoring member from the end face thereof. When a load is applied to the ribs of the thread located closest to the anchor plate 13, the portion of the anchoring member 50 which contacts the tension rod 5 can yield radially until the annular gap 53 is closed. The anchoring member 50 then ensures the further absorption of the circumferential tensile forces by means of its reinforcement 52.

Figure 11:
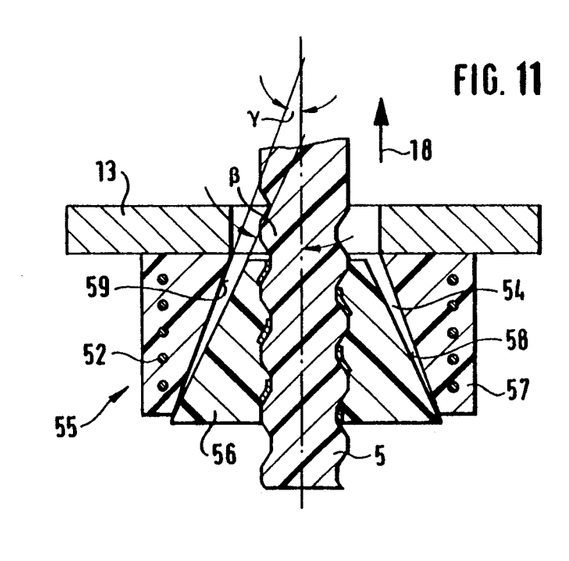
Figure 12:
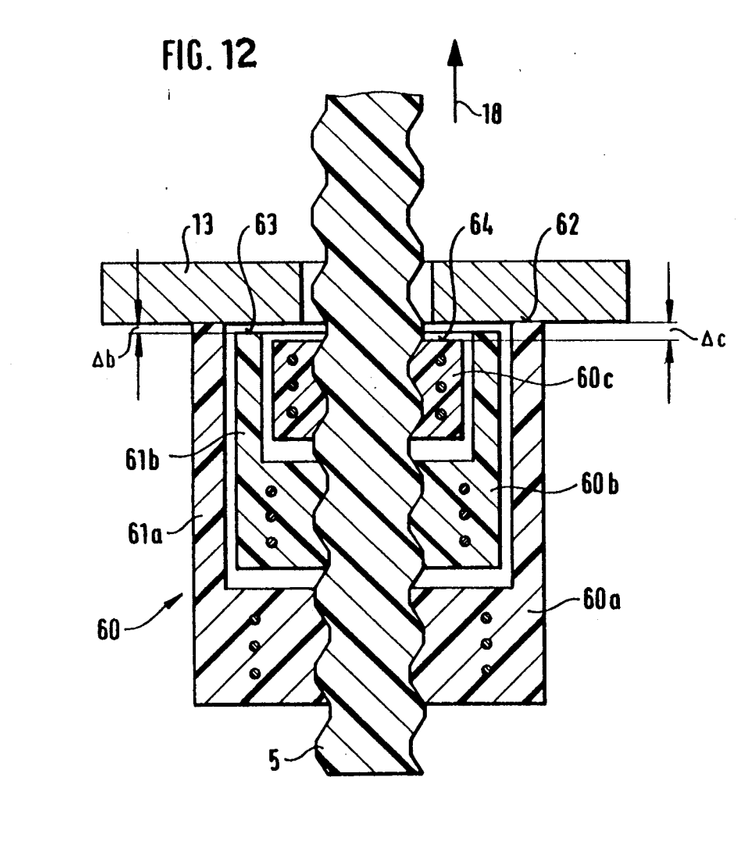

In the embodiment illustrated in FIG. 11, the anchoring member 55 is composed of two parts, namely, an inner threaded part 56 and an outer annular sleeve 57. The inner threaded part 56 has an outer surface 58 which extends conically at an angle $\delta$ relative to the longitudinal axis, and the annular sleeve 57 has an inner surface 59 which is inclined at a smaller angle $\gamma$ relative to the longitudinal axis, so that an annular gap 55 remains between the two surfaces. Thus, also in this case, when the load increases, the portion of the inner threaded part 56, which is adjacent to the anchor plate 13, can expand until the annular gap 54 is closed and a further expansion is prevented by the outer annular sleeve 57. Similar to the embodiment of FIG. 10, the annular sleeve 57 may have a reinforcement 52. However, the annular sleeve 57 may also be composed entirely of steel.

It is apparent that, in addition to the embodiments discussed above, there are a large number of further possibilities for changing the circumferential tensile stiffness of an anchoring nut by changing the cross section of the nut or the cross section of the reinforcement for absorbing the annular tensile forces.

The above-described control of the force transmission between anchor rod and anchoring element can only be used as long as the extent of the elongation of the anchor rod in the anchoring area does not exceed the pitch of the thread, i.e., the distance between two successive ribs of the thread. If a regulation of the elongation by widening the anchoring element is not possible for geometrical reasons, there is the possibility of constructing the anchoring element from several components which are separate from each other, wherein the components are arranged in axial direction, one behind the other on the tension rod, and bear independently of each other against the abutment. An anchoring arrangement of this type is shown in FIG. 13.

In the embodiment of FIG. 13, the anchoring member 60 is composed of three parts 60a, 60b, and 60c, which are constructed in accordance with the present invention and are screwed, independently of each other and with a slight spacing between each other, on the tension rod 5. The innermost part 60c is constructed as a normal nut and is spaced from the anchor plate 13 by a distance $\Delta c$. The additional parts 60b and 60a are arranged outside of the part 60c and rest with cup-shaped projections 61b and 61a independently of each other, directly against the anchor plate 13.

In the illustrated embodiment, the outermost part 60a, with its contact surface 62b, is already in engagement with the anchor plate 13. The contact surface 63 of the middle part 60b is spaced by a distance $\Delta b$ from the anchor plate 13, and the contact surface 64 of the inner part 60c is spaced from the anchor plate 13 by a distance $\Delta c$.

When the tension rod 5 of this anchoring arrangement is elongated as compared to part 60a, because of the partial anchoring by means of the part 60a, the part 60b is moved, because of the elongation, in the direction of the anchoring force symbolically illustrated by arrow 18, toward the anchor plate 13 until its contact surface 63 also makes contact with the anchor plate 13 and, thus, the part 60b contributes to the anchoring effect. When the elongation is continued, the contact surface 64 of the part 60c finally comes into contact in an analogous manner with the anchor plate 13.

Of course, other possible anchoring configurations are conceivable. Thus, it is also possible to connect the parts to each other in a frictionally engaging manner.

It should be understood that the preferred embodiments and examples described are for illustrative purposes only and are not to be construed as limiting the scope of the present invention which is properly delineated only in the appended claims.

We claim:

1. An anchoring arrangement comprising a rod-shaped tension member of composite fiber material comprised of unidirectional fibers embedded in a matrix of synthetic resin, the tension member having, at least over an anchoring portion thereof, a helically extending continuous external thread, the external thread comprising ribs formed by impressing valleys into the tension member, the thread having sides extending between the ribs and the valleys, and an anchoring member adapted for resting against a support surface for tensioning the tension member, the anchoring member being stiff with respect to circumferential tension and having an internal thread essentially corresponding to the external thread of the anchoring portion of the tension member, the anchoring member being screwed onto the anchoring portion of the tension member, the tension member having a longitudinal axis, the sides of the external thread having an angle of inclination relative to the longitudinal axis of the tension member, wherein the angle of inclination is smaller than 45° for obtaining a radial pressure acting on the tension member when the tension member is tensioned.

2. The anchoring arrangement according to claim 1, wherein the angle of inclination is smaller than 30°.

3. The anchoring arrangement according to claim 2, wherein the angle of inclination is approximately between 15° and 30°.

4. The anchoring arrangement according to claim 1, wherein the external thread is a flat trapezoidal thread.

5. The anchoring arrangement according to claim 1, wherein the external thread and the internal thread each have a pitch, wherein the pitch of the internal thread of the anchoring member is slightly greater than the pitch of the external thread of the tension member.

6. The anchoring arrangement according to claim 1, wherein the tension member has a radially inner portion and a radially outer portion surrounding the inner portion, and wherein fibers in the radially inner portion extend into the radially outer portion along the anchoring portion of the tension member.

7. An anchoring arrangement comprising a rod-shaped tension member of composite fiber material comprised of unidirectional fibers embedded in a matrix of synthetic resin, the tension member having, at least over an anchoring portion thereof, a helically extending continuous external thread, the external thread comprising ribs formed by impressing valleys into the tension member, the thread having sides extending between the ribs and the valleys, and an anchoring member of plastics material adapted for resting against a support surface for tensioning the tension member, the anchoring member having an internal thread essentially corresponding to the external thread of the anchoring portion of the tension member, the anchoring member being screwed onto the anchoring portion of the tension member, the tension member having a longitudinal axis, the anchoring member having a length in longitudinal direction of the tension member, the anchoring member having a circumferential tensile stiffness which changes over the length of the anchoring member in engagement with the tension member.

8. The anchoring arrangement according to claim 7, wherein the anchoring member has a first end facing the support surface and a free end remote from the first end, wherein the circumferential tensile stiffness of the anchoring member is smaller at the first end than at the free end.

9. The anchoring arrangement according to claim 7, wherein the anchoring member has a cross-sectional size, and wherein the cross-sectional size of the anchoring member changes over the length of the anchoring member, so that the circumferential tensile stiffness of the anchoring member changes over the length of the anchoring member.

10. The anchoring arrangement according to claim 7, wherein the anchoring member comprises an inner threaded part having a conical outer surface and an outer annular sleeve having a conical inner surface surrounding the inner threaded part, wherein the conical outer surface of the inner threaded part and the conical inner surface of the annular sleeve each has an angle of inclination relative to the longitudinal axis of the tension member, and wherein the angle of inclination of the outer surface of the inner threaded part is greater than the angle of inclination of the inner surface of the annular sleeve such that, in an unloaded state of the anchoring arrangement, an annular gap which widens toward the support surface exists between the outer surface of the inner threaded part and the inner surface of the annular sleeve.

11. The anchoring element according to claim 7, wherein the anchoring member comprises tension-proof and compression-proof reinforcing elements with low susceptibility to stretching for absorbing axial shearing forces and circumferential tensile forces, the reinforcing elements being embedded in the anchoring member at least adjacent the internal thread thereof.

12. The anchoring arrangement according to claim 11, wherein a plurality of different reinforcing elements are embedded in the anchoring member for absorbing the axial shearing forces and the circumferential tensile forces.

13. The anchoring arrangement according to claim 11, wherein the reinforcing elements have cross-sectional sizes, and wherein the cross-sectional size of at least one of the reinforcing elements changes over the length of the anchoring member for changing the circumferential tensile stiffness of the anchoring member.

14. The anchoring arrangement according to claim 11, wherein at least one spiral of sectional steel is provided as a reinforcing element.

15. The anchoring arrangement according to claim 14, wherein the spiral has windings with surfaces, and wherein the spiral is embedded in the anchoring member such that a portion of the surface of the windings simultaneously forms a portion of the internal thread.

16. The anchoring arrangement according to claim 15, wherein the spiral is of steel wire and the windings of the spiral are located in peaks of the internal thread.

17. The anchoring arrangement according to claim 15, wherein the spiral is of a steel strip, the steel strip having a shape conforming in transverse direction to a contour of ribs of the internal thread.

18. The anchoring arrangement according to claim 17, wherein the steel strip has a rear side facing away from the tension member, profiling being provided on the rear side of the steel strip.

19. The anchoring arrangement according to claim 18, wherein the profiling is in the form of ribs.

20. The anchoring arrangement according to claim 11, wherein the reinforcing elements are bundles of very fine wires or fibers.

21. The anchoring arrangement according to claim 11, wherein the reinforcing elements are strips of very fine wires or fibers.

22. The anchoring arrangement according to claim 11, wherein the reinforcing elements comprise a closed threaded sectional member.

23. The anchoring arrangement according to claim 22, wherein the sectional member is a profiled tube.

24. The anchoring arrangement according to claim 7, wherein the anchoring member comprises at least two separate parts arranged one behind the other in axial direction on the tension member, the two pans contacting the support surface independently of each other.

25. The anchoring arrangement according to claim 24, wherein the at least two parts are mounted relative to the support surface such that they bear against the support surface as a result of the tensioning of the tension member.

26. The anchoring arrangement according to claim 25, wherein the at least two parts are mounted such that they rest successively against the support surface as the tension member is being tensioned, and wherein a part of the at least two parts mounted axially remote from the support surface rests first against the support surface when the tension member is being tensioned.

* * * * *